US010009727B1

(12) United States Patent
Ledet

(10) Patent No.: US 10,009,727 B1
(45) Date of Patent: *Jun. 26, 2018

(54) METHOD AND APPARATUS OF PROVIDING LOCATION BASED DEVICE MODIFICATIONS

(71) Applicant: OPEN INVENTION NETWORK LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/284,012

(22) Filed: Oct. 3, 2016

Related U.S. Application Data

(63) Continuation of application No. 14/542,794, filed on Nov. 17, 2014, now Pat. No. 9,462,414, which is a continuation of application No. 13/221,416, filed on Aug. 30, 2011, now Pat. No. 8,892,129.

(60) Provisional application No. 61/379,049, filed on Sep. 1, 2010.

(51) Int. Cl.
| | |
|---|---|
| *H04W 24/00* | (2009.01) |
| *H04W 4/02* | (2018.01) |
| *H04W 4/021* | (2018.01) |
| *H04W 64/00* | (2009.01) |
| *G06Q 30/02* | (2012.01) |

(52) U.S. Cl.
CPC ........ *H04W 4/023* (2013.01); *G06Q 30/0267* (2013.01); *H04W 4/02* (2013.01); *H04W 4/021* (2013.01); *H04W 64/00* (2013.01)

(58) Field of Classification Search
CPC ... H04W 4/206; G06Q 30/02; G06Q 30/0241; G06Q 30/0251; G06Q 30/0266; G06Q 30/0268; G06Q 30/0277
USPC ............. 455/404.2, 456.1–457; 340/539.13, 340/988–996; 705/14.4–14.73; 725/42
See application file for complete search history.

(56) References Cited

U.S. PATENT DOCUMENTS

| | | | | |
|---|---|---|---|---|
| 2010/0161658 | A1* | 6/2010 | Hamynen | H04W 24/00 707/770 |
| 2010/0210313 | A1* | 8/2010 | Huang | H04M 19/041 455/567 |

* cited by examiner

*Primary Examiner* — Ronald Eisner
(74) *Attorney, Agent, or Firm* — Haynes and Boone, LLP

(57) ABSTRACT

Disclosed are examples of performing mobile station modifications. According to one example a method may include transmitting a notification from a mobile station to an advertisement server and receiving at least one advertisement parameter at the mobile station responsive to the transmitted notification. The method may also include performing a modification to a current state of the mobile device based on the at least one advertisement parameter and a distance between the mobile station and at least one establishment registered with the advertisement server.

20 Claims, 7 Drawing Sheets

| Method | Description |
|---|---|
| getSupportedLocationSources() | This method returns an integer mask that represents the location sources that the device supports. |
| isLocationSourceSupported(int mode) | This method returns a value of true if the source you specify is supported on the device. |
| getAvailableLocationSources() | This method returns an integer mask that represents the location sources that the device supports. A location source is available if it is supported and enabled for use. |
| isLocationSourceAvailable(int mode) | This method returns a value of true if the mode you specify is available to provide location information. |

METHOD AND APPARATUS OF PROVIDING LOCATION BASED DEVICE MODIFICATIONS

CROSS REFERENCE TO RELATED APPLICATIONS

This application claims benefit of and is a continuation of U.S. patent application Ser. No. 14/542,794, entitled "METHOD AND APPARATUS OF PROVIDING LOCATION BASED DEVICE MODIFICATIONS", issued as U.S. Pat. No. 9,462,414 on Oct. 4, 2016, which is a continuation of U.S. patent application Ser. No. 13/221,416, filed on Aug. 30, 2011, entitled "METHOD AND APPRATUS OF PROVIDING LOCATION BASED DEVICE MODIFICATIONS", issued as U.S. Pat. No. 8,892,129 on Nov. 18, 2014, which claims the benefit of provisional application No. 61/379,049, entitled "Location Based Device Modification", filed on Sep. 1, 2010, the entire contents of each are hereby incorporated by reference.

TECHNICAL FIELD OF THE INVENTION

This invention relates to a method and apparatus of implementing location based modifications to an end user device, and more particularly to initiating changes to a mobile device that will be noticed by the end user.

BACKGROUND OF THE INVENTION

The mobile advertisement market has grown exponentially as the use of mobile devices continues to grow. The mobile advertisement market is expected to grow to $5.7 billion by 2014. One of the main factors for this growth is that most consumers have mobile devices with them nearly all the time, and the always-connected nature of the mobile device provides access to dynamic advertising.

Of the roughly 1,000 smartphone users surveyed, 52% claim they have acted on an advertisement via an application and 18% have made a purchase directly from an advertisement application in the last month. Currently, location-based services are beginning to provide attractive alternatives for small-scale advertisers. For example, even small businesses are capable of distributing targeted offers to the end users based on a user's actual proximity to their location. These offers can deliver heightened relevance by appealing to a user's status, nearby friends, demonstrated preferences, etc. There are a number of mobile applications and tools emerging that consumers can use to make their shopping trips more efficient, productive, and desirable.

A current limitation of mobile advertising is that it is a type of highly targeted advertising, and advertisers are hesitant to commit to certain types of advertising until they perceive that the audience for their advertisements has reached a certain level. Another limitation is the targeted nature of mobile advertising. Users do not want to have advertisements interrupt them in their normal use of the mobile device. The mobile advertisements must be highly relevant in order to be considered by the user.

SUMMARY OF THE INVENTION

An example embodiment may provide a method that includes transmitting a notification from a mobile station to an advertisement server. The method may also include receiving at least one advertisement parameter at the mobile station responsive to the transmitted notification, and performing a modification to a current state of the mobile device based on the at least one advertisement parameter and a distance between the mobile station and at least one establishment registered with the advertisement server.

Another example embodiment of the present invention may include a mobile station including a transmitter configured to transmit a notification to an advertisement server. The mobile station may include a receiver configured to receive at least one advertisement parameter at the mobile station responsive to the transmitted notification, and a processor configured to perform a modification to a current state of the mobile device based on the at least one advertisement parameter and a distance between the mobile station and at least one establishment registered with the advertisement server.

BRIEF DESCRIPTION OF THE DRAWINGS

FIG. 2 illustrates an example table of functions used by the user application according to example embodiments of the present invention.

DETAILED DESCRIPTION OF THE INVENTION

Figure 1:
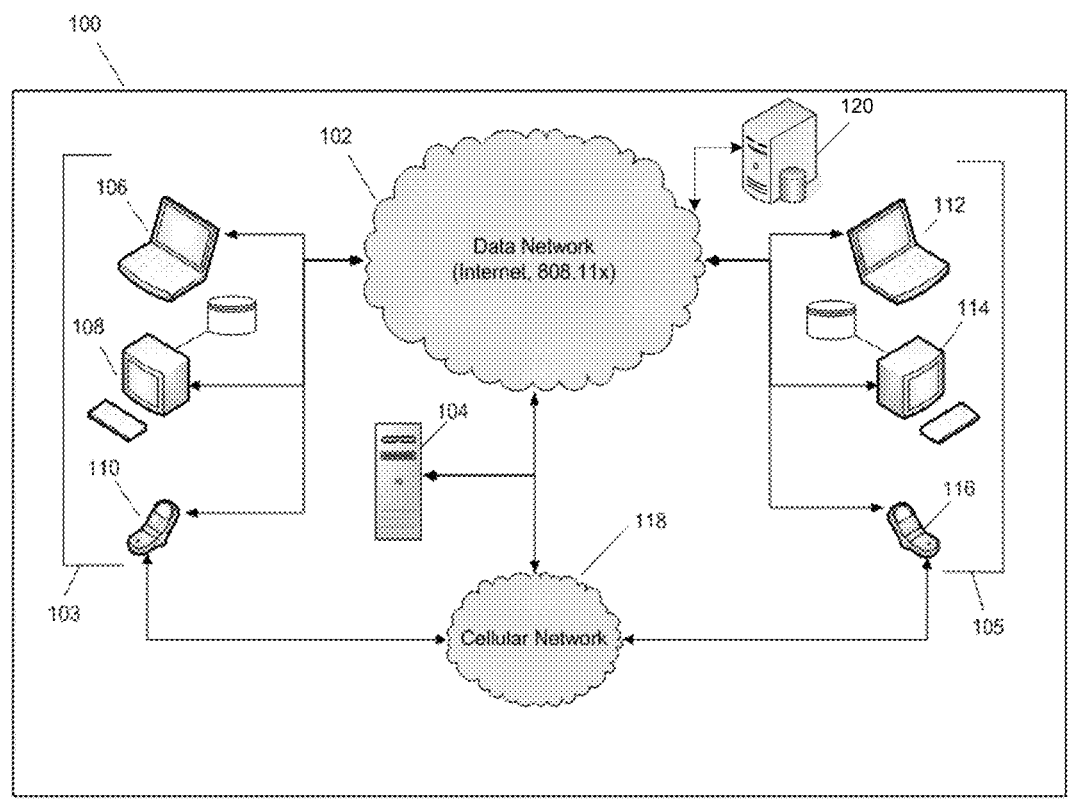
FIG. 1 illustrates an example communication network designed to support the user application according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments disclose procedures to provide altering modifications to a mobile device according to a location within a given domain. More specifically, the mobile device utilizing temperature modification technology, digital scent technology, and other location-based services technology may alter a current state of the mobile device to obtain a user's attention.

Example embodiments may utilize certain example technologies including but not limited to temperature modification, digital scent, and location based implementations to allow advertisers to make their mobile advertisements more interesting and engaging to the mobile device user. As a result, the user will be more attentive to the advertisement than if the advertisements did not implement the added technology with the advertisements.

Technology has progressed within the area of cooling internal components of a computing device due mostly to the fact that the internal processors have exponentially grown in speed thus generating more heat. Many various methods have been incorporated to cool internal components including air flow, which is the most common way to cool internal computer components. Such a cooling mechanism requires that flowing air be carried through the heart of the computer components.

Another example may include thermal electric component coolers, which are used as heat sinks paired with fans for more effective cooling ability than merely blowing air at a hot component. Yet another example may include liquid cooled internal and external radiators, these radiators use liquid to conduct the heat away from the component to an internal fan driven radiator.

Recently, the IEEE published research regarding the heat generated by a mobile device. Power dissipation levels in mobile electronics devices are heading towards five watts and above. With this power dissipation level, products such as mobile phones will require active cooling to ensure that the devices operate within an acceptable temperature envelop from both user comfort and reliability perspectives. It was noted that a centrifugal fan is implemented into certain mobile phones. Its performance was compared in terms of aerodynamic characteristics, maximum phone surface temperature, and allowable phone heat dissipation for various levels of blockage in the phone, which were simulated using perforated plates with varying porosity. The results indicated that with minimal blockage increased power dissipation levels were 75%, but with realistic blockages this value is more likely to be in the region of 50%.

According to another example, a heat pipe is a heat transfer mechanism that can transport large quantities of heat with a very small difference in temperature between the hot and cold interfaces. A typical heat pipe includes a sealed hollow tube made of a thermo-conductive metal, such as copper or aluminum. The pipe contains a relatively small quantity of a "working fluid" or coolant, such as water, ethanol or mercury with the remainder of the pipe being filled with the vapor phase of the working fluid, all other gases being excluded. The advantage of heat pipes is their great efficiency in transferring heat. These heat pipes are actually more "conductive" than a copper bar of equivalent cross-section.

According to another example, a Peltier cooling plate utilizes what is known as the Peltier effect to create a heat flux between the junction of two different types of materials. This effect is commonly used for cooling electronic components and small instruments. There are no moving parts and such a device is maintenance free. Due to the relatively low efficiency, thermoelectric cooling is generally only used in environments where the solid state nature outweighs the poor efficiency. Thermoelectric junctions are generally only around 10% as efficient as the ideal refrigerator (Carnot cycle), compared with 40% achieved by conventional compression cycle systems.

According to another example, a synthetic jet is produced by a continual flow of vortices that are formed by alternating brief ejection and suction of air across an opening such that the net mass flux is zero. A unique feature of these jets is that they are formed entirely from the working fluid of the flow system in which they are deployed, which can produce a net momentum to the flow of a system without net mass injection to the system. Synthetic jet air movers have no moving parts and are thus maintenance free. Due to the high heat transfer coefficients, high reliability but lower overall flow rates, synthetic jet air movers are usually used at the chip level and not at the system level for cooling. However depending on the size and complexity of the systems they can be used for both instances.

According to example embodiments, a digital scent technology is part of the interactive entertainment experience. The basic idea is to scent-enable certain movies, games, music, animation, or any digital media. This technology is currently of interest in the computer industry, more specifically the mobile device industry. Example embodiments utilize the digital scent technology to aid advertisers in not only bringing attention to the user's mobile device, but aid in providing a more immersing experience that will further the interest of the mobile device's user, therefore securing more advertising revenue.

According to example embodiments, location based services (LBS) is an information and entertainment service, accessible with mobile devices through the mobile network utilizing the ability to make use of the geographical position of the mobile device. LBS services can be used in a variety of contexts, such as health, work, personal life, etc. LBS services include services to identify a location of a person or object, such as discovering the nearest banking cash machine or the whereabouts of a friend or employee. LBS services include parcel tracking and vehicle tracking services. LBS can include mobile commerce when taking the form of coupons or advertising directed at customers based on their current location including, for example, personalized weather services and even location-based games.

Some examples of locating methods currently utilized in LBS include control pane locating, sometimes referred to as positioning. This service utilizes the radio signal delay of the closest cell-phone towers for phones without GPS features, which can be quite slow as it uses the 'voice control' channel. Several examples can be used to find the location of the subscriber and are described below, for example, the simple and standard solution is GPS-based LBS. A current mobile device manufacturer's "NearMe" technology is one such example. It is used to maintain knowledge of the exact location of the mobile device. However, such LBS features can be expensive for the end-user, as they would have to invest in a GPS-equipped handset. GPS is based on the concept of tri-lateration, a basic geometric principle that allows finding one location if one knows its distance from other, already known locations.

Another example used to locate a mobile device is GSM localization. Determining the location of a mobile device in relation to its cell site is another way to find out the location of an object or a person. This example relies on multi-lateration of the signal from cell sites serving a mobile phone. The geographical position of the device is found out through various signal tracking techniques, such as time difference of arrival (TDOA) or enhanced observed time difference (E-OTD).

Another example is near LBS (NLBS), in which local-range technologies such as Bluetooth, WLAN, infrared and/or RFID/Near field communication technologies are used to match devices to nearby services. This application allows a person to access information based on their surroundings, especially suitable for use inside closed premises, and restricted areas. Another alternative is an operator and GPS-independent location service based on access into the deep level of the network. This solution enables accurate and quick determination of geographical coordinates of mobile phone numbers by providing operator-independent location data, which also works also for handsets that are not GPS-enabled.

Location-based advertising (LBA) is a new form of advertising that uses location-tracking technology in mobile networks to target consumers with location-specific advertising on their mobile devices. To further describe an example of LBA in use, if a tourist is in Tokyo with friends and is looking for a restaurant, she can just use her mobile phone to connect to the 'dining club's' websites to browse according to her location, culinary preference, and time. The dining club server then provides her with a list of nearby restaurants offering the culinary preference and accepting discount coupons presented at that the same time.

The LBA push approach delivers information and advertisements to the user, as determined by the device's location. In addition, within the push approach, there are also two types of advertising including not requested and indirectly requested services. A not requested service, advertisers would send ads to users until users request them not to send anymore. In contrast, an indirectly requested service, advertisers must receive permission from users before sending the ads to them. For example, the push approach was used in "geo-fencing" when moviegoers walked past a theater and received text messages to download free movie samples. In this case, an indirect requested service would indicate that recipients would have previously indicated their interest in receiving messages from the theaters, where an unrequested service would indicate they would not have already indicated their interests.

The example embodiments of the current invention utilize LBS and LBA technologies in addition to other technical areas allowing location-based advertisements that are not only presented to the user of the mobile device at an ideal time, but which also allows the advertiser to "seize" the user's attention unlike before.

FIG. 1 illustrates a network architecture 100 according to example embodiments of the present invention. Referring to FIG. 1, a user utilizing a client machine 103 may access an application in the form of software, for example, to be downloaded from memory of the server 104. Alternatively, the application may currently reside in memory on the client's machine 103. The client machine can be any of a mobile laptop device 106, a personal desktop computer 108, or a cellular device 110 or smartphone. The client machine 103 is connected to the Internet 102.

According to example embodiments, it is assumed that the application of resides on the server 104. The user will be accessing the client machine 103, and connecting to a remote 105 machine. The remote machine 105 can include any of a mobile laptop device 112, a personal desktop computer 114, or a cellular device 116. The remote machine 105 is connected to the Internet 102. If the client is on a cellular device 110/116, the server 104 can be accessed via the Internet 102, or the cellular network 118. It should be noted that other types of devices, in addition to devices 103 and 105, might be used with the present invention. For example, a PDA, an MP3 player, a smartphone, a table computing device, a gaming device, such as a hand held system or home based system and the like that can also be used to transmit and receive information on the network 100.

The user may interface through a graphical user interface (GUI) that is accessed via one or more of the devices 103. The application will interact with an advertisement server 120 through the Internet to receive advertisements. The user will interact with mobile advertisements as depicted below. For example, it is assumed that the user may be walking down a street with the application installed on the user's mobile phone in his or her possession. It may be assumed that the locally advertised companies, such as a local coffee shop or other organization is also utilizing the mobile advertisement technology associated with the application of the current invention. It is also assumed that the user has accepted any necessary agreements, allowing mobile advertisements to be received on the mobile device.

Using location-based services, the application is aware of the location of the mobile device, and by communicating with an advertisement server, the application is also aware of establishments that have contracted to deliver mobile advertisements through the application. As the user nears a local coffee shop establishment, the application becomes aware that the user is near an entity in which mobile advertisements can be delivered through the application. The application queries an advertisement server 120 and receives a response indicating that the advertisement allows a thermal change in the current operating condition of the device (i.e., cold to hot, or hot to cold, etc.), as well as triggering a scent element in the mobile device. Please see FIG. 4 below for a detailed description of the messaging between the application of the current invention and the application server.

An indication is provided to the user of the mobile device so the user will be aware of the mobile advertisement's presence. This indication can be a blinking or pulsating icon on the mobile device or any other indication that, when viewed, will draw the attention of the user. The mobile device begins to become warmer and begins to emit either a chocolate, or coffee odor, or any other odor that matches both the available scent elements in the user's mobile phone, and the scent that the advertisement desires to emit.

When the blinking or pulsating icon is pressed, an advertisement is presented to the user that can be related directly to both the thermal change in the exterior of the mobile device and the scent that was emitted through the triggering of the scent element in the mobile phone. Example embodiments utilize location based services, more specifically, push location based advertising, to alert the application server 103 that a mobile device has entered a domain of an advertising entity and that an advertisement needs to be served to the user. The location based services integrate an application with a geographic location.

Mobile devices combine LBS with mapping functionality on the device. In order for LBS to be active on the mobile device 103, location services must be active on the device. This allows the mobile device 103 to synchronize with location satellites which provide location data from the geolocation service. This service cannot be turned on remotely, but only by the user of the mobile device.

Some of the procedures available to query location sources are illustrated in table 202 of FIG. 2. For example, getSupportedLocationSources() this procedure returns an integer mask that represents the location sources that the device supports. Another procedure includes isLocationSourceSupported(int mode), this procedure returns a value of true if the source you specify is supported on the device. Another procedure includes getAvailableLocationSources() this procedure returns an integer mask that represents the location sources that the device supports. A location source is available if it is supported and enabled for use. Another procedure includes isLocationSourceAvailable(int mode), this procedure returns a value of true if the mode you specify is available to provide location information.

In the above table 202, the example procedures listed are utilized to obtain the location sources for the mobile device 103. These sources are then used, in addition to GPS modes to query the location of the mobile device 103. Once the location of the mobile device 103 falls within a domain of an advertising entity, an advertisement is delivered to the mobile device via action taken by the server 104 to obtain an advertisement from the advertisement server 120.

The application may utilize digital scent technology to enable the advertising entity to alter the scent emitting from the mobile device. In one embodiment of the current invention, digital scent cartridges are available that the user would insert into the mobile device. Heat generated from the mobile phone's battery is used to release the scents, which is controlled by the application and the advertisement received at the mobile device 103.

Figure 3:
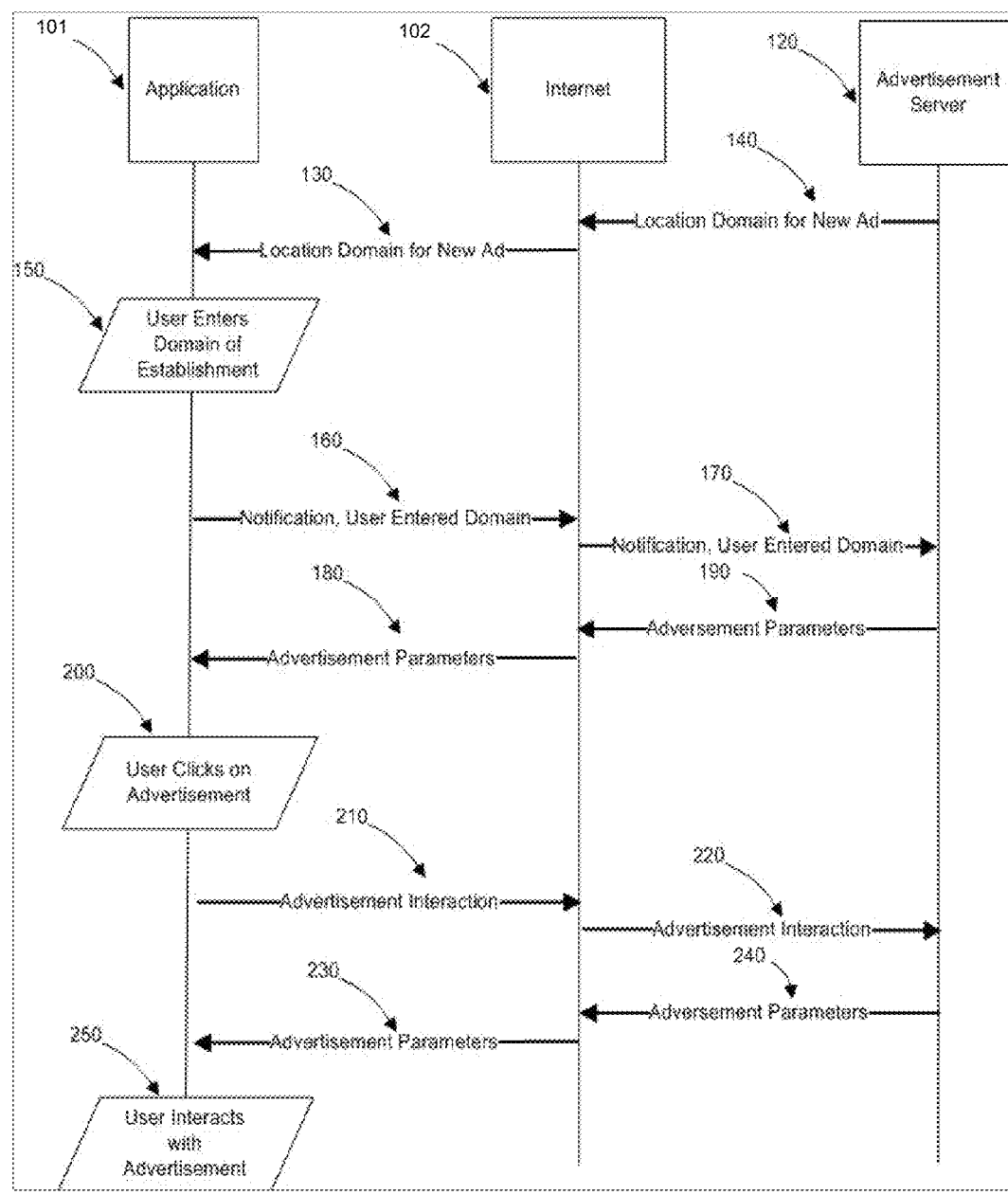
FIG. 3 illustrates an example communication network demonstrating relationships between the entities according to example embodiments of the present invention.

FIG. 3 illustrates an example signaling diagram of an interaction between the application operating on the server 104 and/or the mobile device 103 and the advertisement server 120. Referring to FIG. 3, the application 101 communicates with the advertisement server 120 through the public Internet 110. The application 101 receives the domain coordinates of the advertising entity 130/140 from the advertising server 120, which is then sent across the Internet to the application 101. The domain coordinates allow the application 101 through the use of LBS to be aware of when the user enters the domain of an entity that has an established contract with the application server 104. According to one example, the domain coordinates are stored for later reference. Through the use of LBS, the diameter from the entity's location or the distance where the notification is activated can be determined.

The received location and coordinate information within the location diameter of the entity are entered into the application at operation 150. This triggers the application 101 to send a notification 160 to the Internet and 170 to the advertisement server 120. This notification makes the application server aware that a user that is capable of receiving the advanced advertisement data and is located in the appropriate domain of one of the entities that is contracted to deliver the advanced advertisements.

The advertisement server 120 then sends a notification 190/180 back to the application 100 including parameters that detail the type of functionality supported in the particular advertisement. Each advertisement may have various different features and functions. Some of the functionalities of the advertisement can be turned on or off, according to the contract between the advertising entity and the organization supplying the advertisements. This parameter notification will specify the functionality supported for this particular advertisement (e.g., html only, pictures, sound, music, scent card activation, heat or cool activation, etc.).

Once the application 101 receives the advertisement parameters notification 190/180, the application begins to execute the functionality of the user's mobile device according to the functionality supported in the parameters received in the notification. Also included in the advertising parameter notification 180 may be specific alert indications. This may indicate that an icon is presented to the mobile device's screen which pulsates, or blinks, or provides any other functionality to draw the attention of the user without interacting with the user's normal use of the mobile device. Also, according to both the notification parameters and the ability of the user's mobile device, the user's mobile device begins to emit a scent by applying heat to one of the elements in the mobile device's sense elements. The user's mobile device 103 can begin to either warm up, or cool down according to the parameters received.

In response to receiving advertisement parameters and notification/user entered domain information, the user of the mobile device 103 clicks on the advertisement 200, and an advertisement interaction message 210/220 is sent to the advertisement server 120. The message interaction is optional, and all functionality necessary for the advertisement interaction between the user and the advertisement can be performed in the application 101 on the mobile device 103.

The advertisement server 120 returns with a response to the interaction message by providing another advertisement parameter message 240/230 indicating specific updates to offers that the advertising entity may have updated with the advertising server 120, if necessary. The message interaction ensures that the advertising entity can push the latest advertising messages, updates, coupons, offers, etc. to the user of the mobile device.

The message exchange illustrated in FIG. 3 will occur quickly so that the user does not see a lag in the interaction as the message exchange occurs in the background. The user can interact with the advertisement 250 by showing a coupon to the establishment that has been received on the mobile device 103, printing a coupon displayed on the mobile device 103, or just find out specific offer codes or other information about the establishment.

In another example embodiment, the mobile device 103 is further modified according to the location of device inside the establishment's domain. Once the user enters the domain, the advertisement server 120 is queried for the most current information to be delivered to the mobile device 103. In addition, the movement of the mobile device 103 (as received from the GPS functionality on the mobile device) is monitored and the mobile device 103 is further modified or altered as it moves closer to the establishment. Continuing with the coffee establishment example, the mobile device 103 can become warmer and the scent emitting from the mobile device 103 can become stronger as the user further approaches the establishment.

Figure 4:
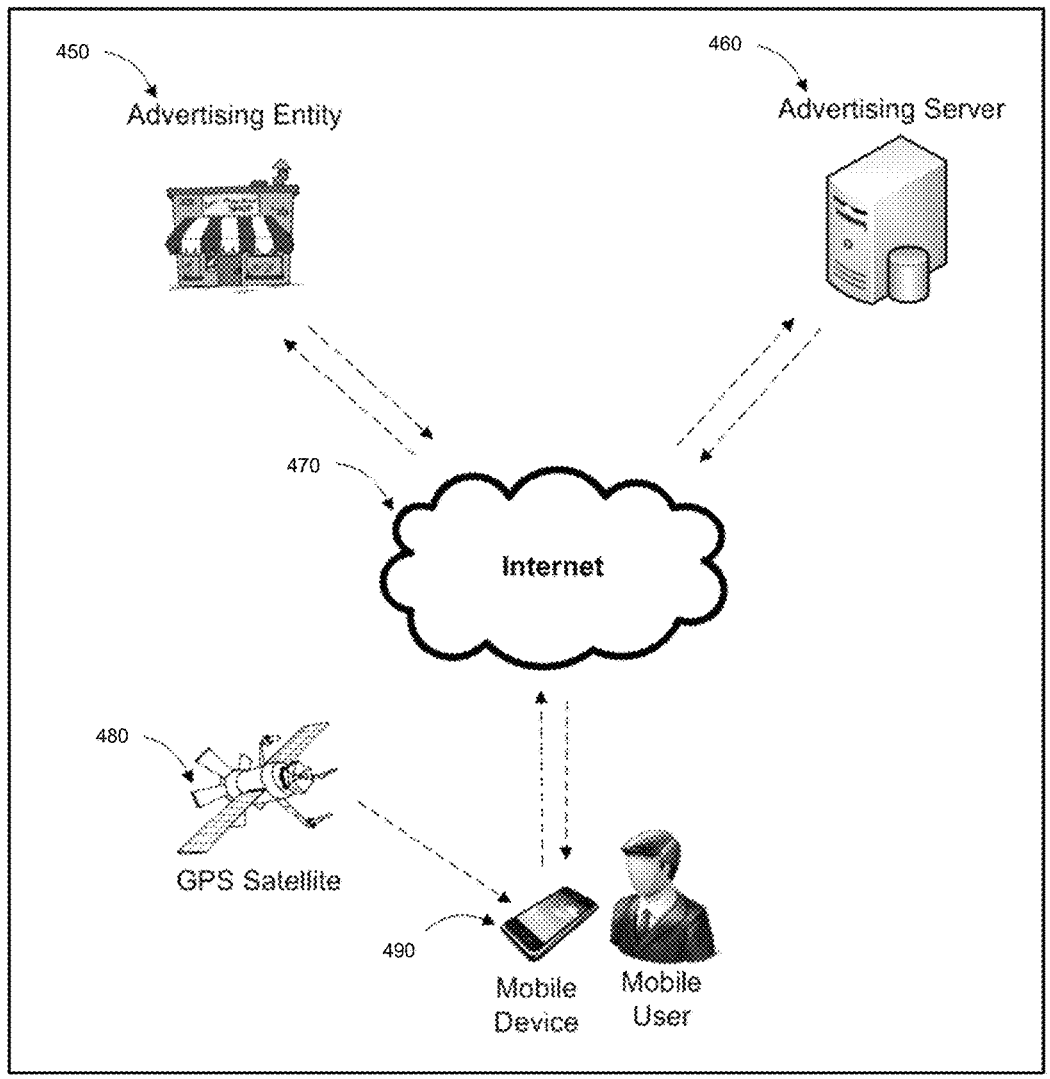
FIG. 4 illustrates a signaling diagram of messages exchanged during the application execution according to example embodiments of the present invention.

FIG. 4 illustrates an example relationship of entities in a network environment according to embodiments of the present invention. The advertising entity 450 may be used to establish an agreement with an advertising organization responsible for establishing a business relationship. An advertisement may then be created and stored in the advertising server 460. The advertisement is established and transferred over the Internet 470. The application may be stored on the mobile device 490. Using LBS, the GPS satellite 480 tracks the location of the mobile device and enable the application in the mobile device 490 to be aware of the mobile user's present location. When the mobile user is within the domain established by the advertising entity 450, the application communicates with the advertising server 460 to obtain the latest information from the advertising entity 450 through the Internet 470.

The application communicates with the advertisement server 460, which specifies the details of the advertisement to be delivered to the user. The advertising server 460 specifies the type of advertisement to deliver to the mobile device 103. The advertisement server stores details of each advertisement specifying the type of advertisement that can be delivered to the mobile device. For example, if the business entity desires to deliver an advertisement that will activate the temperature alteration of the mobile device and/or trigger the scent elements of the mobile device, this agreement is made beforehand and the advertising server 460 delivers the advertisement to the user indicating that both the temperature alteration and the scent element is activated if the user's mobile device supports that technology.

Figure 5:
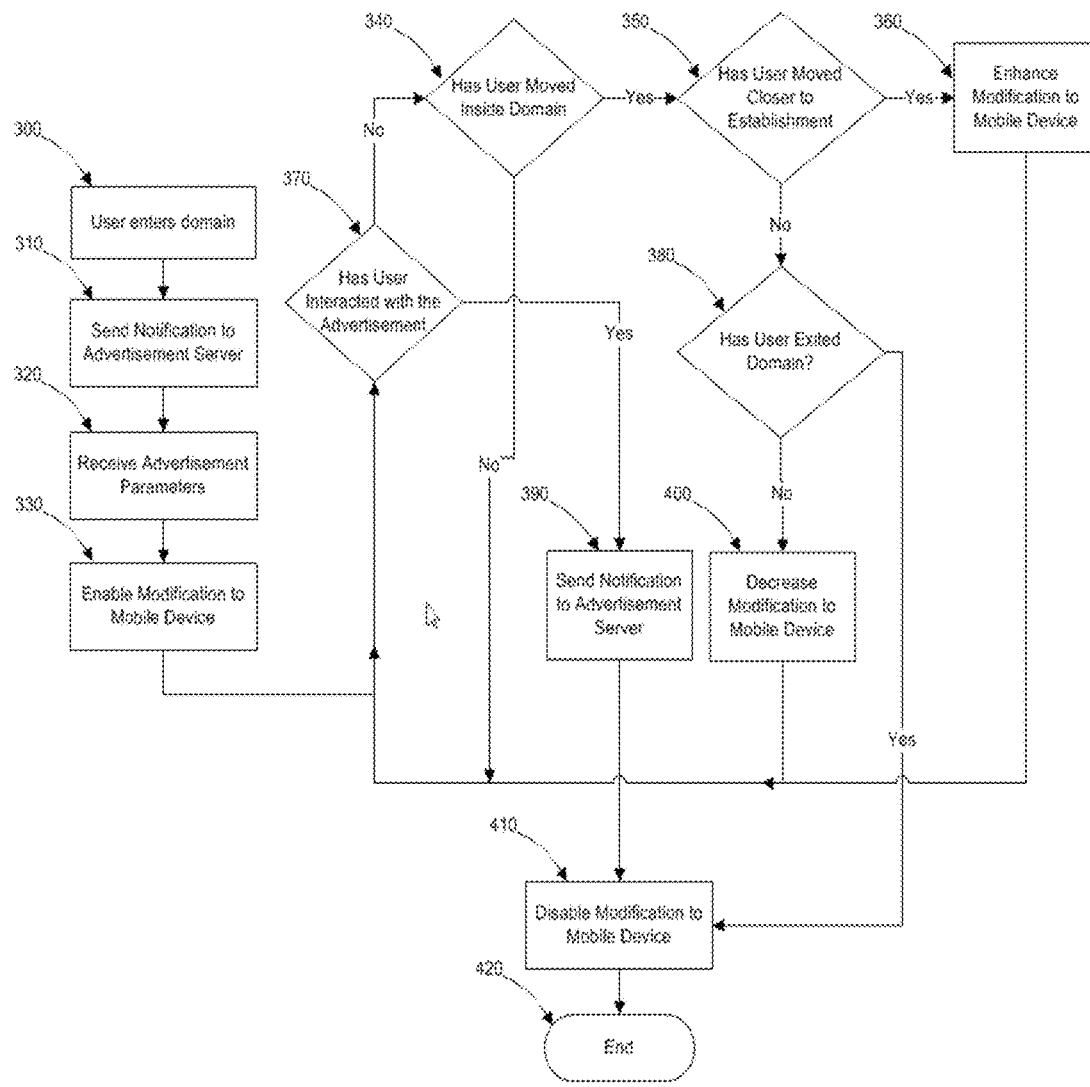
FIG. 5 illustrates a flowchart illustrating an example method of operation according to example embodiments of the present invention.

FIG. 5 illustrates a flowchart depicting an example method of operation. Referring to FIG. 5, the flow diagram depicts the interaction between the application and the advertising server 460. The interaction may include further modifications to the mobile device 103 as the device moves within a particular domain area. Referring to FIG. 5, the user enters the domain of the establishment 300. A notification is sent to the advertisement server to obtain the latest advertising details 310. The latest advertisement details are received 320, and the mobile device 103 is modified according to the parameters received from the advertising server 460 and the supported functionality of the mobile device at operation 330.

A check is made to determine whether the user has interacted with the advertisement 370. If the user has interacted with the advertisement, an optional notification is sent to the advertisement server 390. The modifications to the mobile device are disabled 410 and the process ends 420.

If the user has not interacted with the advertisement, the movement of the mobile device is monitored by the application 340. If the user has moved, the application determines if the user has moved closer to the establishment in which case the modifications to the mobile device are modified 350 and 360. If the user has moved closer to the establishment, the mobile device could become warmer or cooler depending on the parameters received from the advertising server 460, and the scent emitted from the scent cartridges of the mobile device can be increased. If the user of mobile device has not moved inside the establishment's domain, the process continues to loop by starting over again.

If the mobile device 103 has moved further from the establishment, a check is performed to determine if the user has exited out of the domain of the establishment 380 either physically by turning off his or her phone and/or geographically by leaving the diameter area of the domain. If the user has exited the domain, the modifications are disabled from the mobile device 410 and the process ends 420. If the mobile device 103 has moved further from the establishment, but has not moved out of the establishment's domain, the modifications are decreased on the mobile device 400, and the process continues to loop again.

In another embodiment of the current disclosure, the interaction of the user and the advertisement is automatic, and is initiated without interaction (touch, click, etc.) from the user, and the advertisement is delivered to the mobile device 103 in its entirety. In another example, the user has the option to manually alter the modifications that are remotely initiated to the mobile device 103. For example, when entering an establishment's domain, the mobile device 103 becomes colder and begins to emit a fragrant scent. The user in this embodiment will have the option to manually increase or decrease the temperature of the mobile device and/or the fragrant scent of the mobile device 103.

In another embodiment of the current disclosure, the user has the ability to alter the modifications made to the mobile device to transfer a request message to communicate with the advertising establishment the type of product that is of user interest. For example, if the user of the mobile advertisement enters the domain of a coffee shop and the mobile device becomes warmer, the user of the mobile device will alter the temperature of the mobile device making it cooler. This modification is relayed to the advertising server 460 communicating that the user is interested in a colder beverage. The advertising server 460 can then cater the advertisements to reflect colder drinks (i.e., frozen coffee drinks) instead of the initial warmer beverages (i.e., hot coffee drinks).

Figure 6:
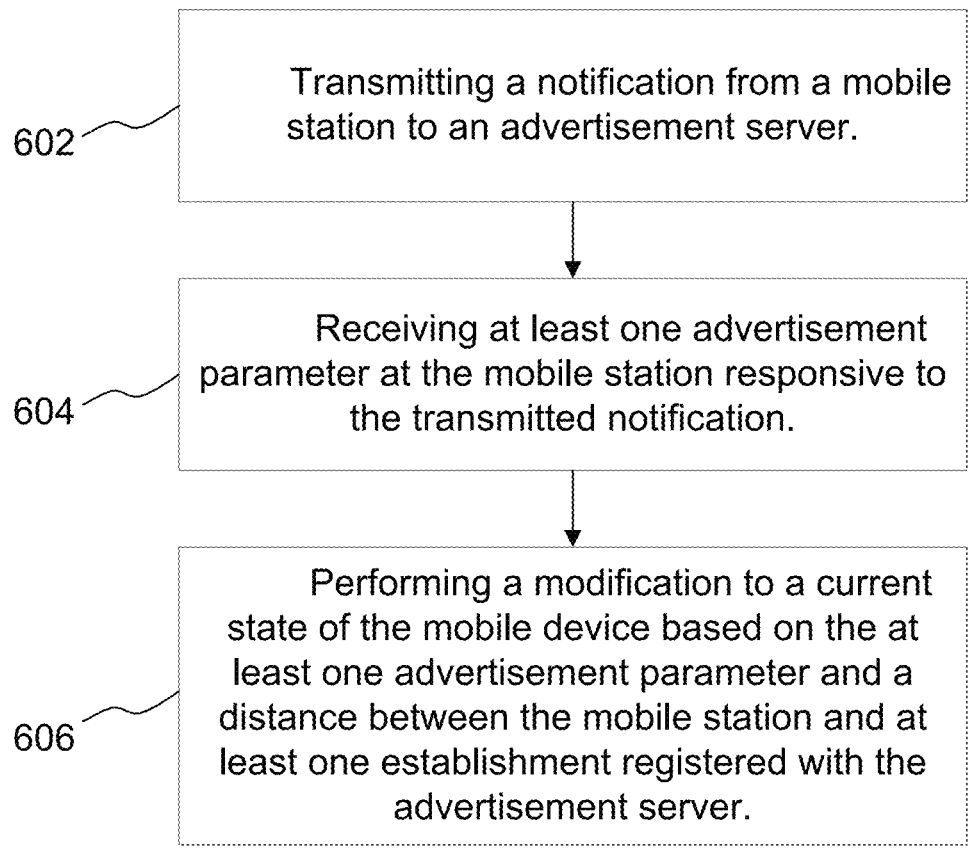
FIG. 6 illustrates a flow diagram according to example embodiments of the present invention.

FIG. 6 illustrates an example method of operation according to example embodiments of the present invention. Referring to FIG. 6, the method may include transmitting a notification from a mobile station to an advertisement server, at operation 602. The method may also include receiving at least one advertisement parameter at the mobile station responsive to the transmitted notification at operation 604. The method may also include performing a modification to a current state of the mobile device based on the at least one advertisement parameter and a distance between the mobile station and at least one establishment registered with the advertisement server at operation 606.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components of the other figures.

Figure 7:
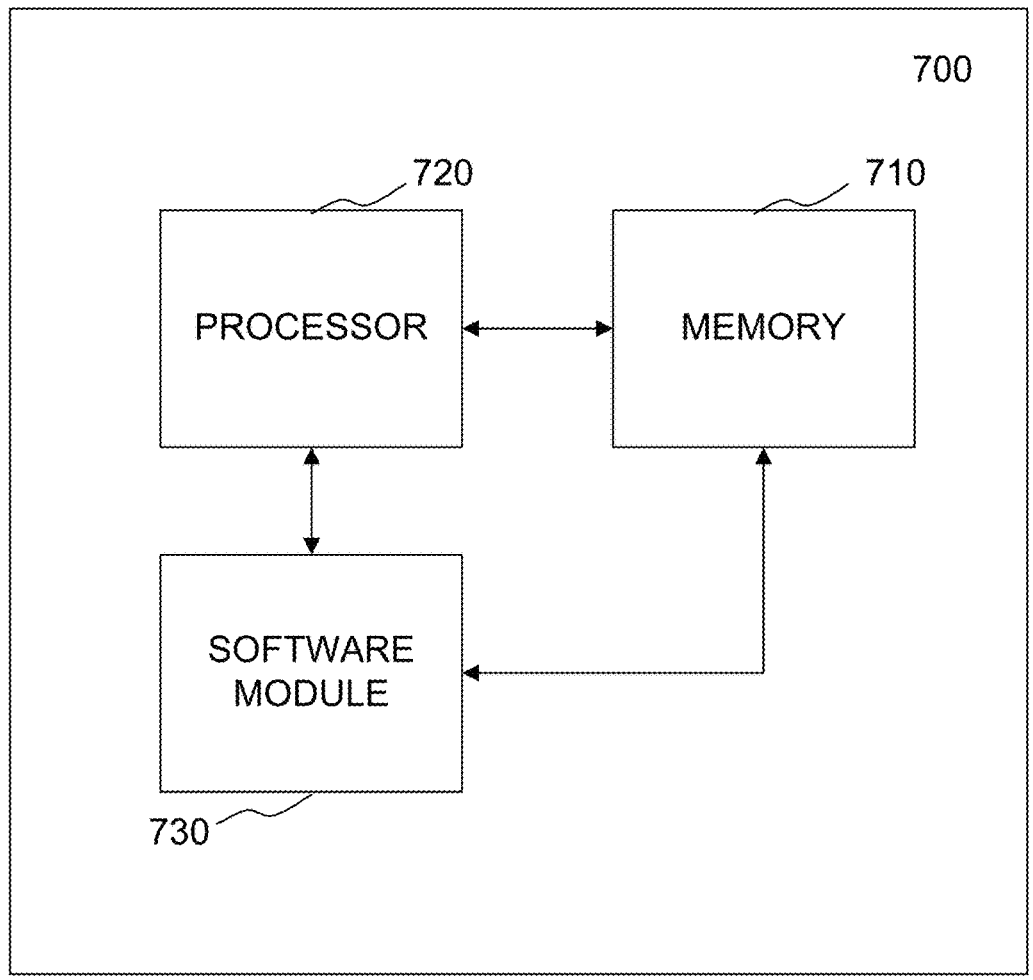
FIG. 7 illustrates a network entity that may include memory, software code and other computer processing hardware, and which may be configured to perform operations according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    receiving at least one advertisement parameter at a mobile station responsive to a notification received at an advertisement server;
    performing a modification to a current state of the mobile station based on the at least one advertisement parameter and a distance between the mobile station and at least one establishment registered with the advertisement server, wherein the modification comprises a change of audio and video controls of the mobile station; and
    increasing an intensity of the change of audio and video controls of the mobile station based on a function of the distance.

2. The method of claim 1, wherein the notification is sent automatically when the mobile station enters a predetermined geographic domain associated with the at least one establishment.

3. The method of claim 1, wherein the modification to the current state of the mobile station comprises a change in scent.

4. The method of claim 1, wherein the modification to the current state of the mobile station comprises a change in temperature.

5. The method of claim 1, further comprising decreasing the intensity of the modification to the current state of the mobile station as the mobile station moves further from the establishment.

6. The method of claim 2, further comprising disabling the modification to the current state of the mobile station when the mobile station exits the predetermined geographic domain.

7. The method of claim 1, wherein the at least one establishment is at least one of a retail outlet, a restaurant, a service center and a government entity.

8. A mobile station, comprising:
    a receiver configured to receive at least one advertisement parameter at a mobile station responsive to a notification received at an advertisement server; and
    a processor configured to perform:
        a modification to a current state of the mobile station based on the at least one advertisement parameter and a distance between the mobile station and at least one establishment registered with the advertisement server, wherein the modification comprises a change of audio and video controls of the mobile station; and
        an increase of an intensity of the change of audio and video controls of the mobile station based on a function of the distance.

9. The mobile station of claim 8, wherein the notification is sent automatically when the mobile station enters a predetermined geographic domain associated with the at least one establishment.

10. The mobile station of claim 8, wherein the modification to the current state of the mobile station comprises a change in scent.

11. The mobile station of claim 8, wherein the modification to the current state of the mobile station comprises a change in temperature.

12. The mobile station of claim 8, wherein the processor is further configured to decrease the intensity of the modification to the current state of the mobile station as the mobile station moves further from the establishment.

13. The mobile station of claim 9, wherein the processor is further configured to disable the modification to the current state of the mobile station when the mobile station exits the predetermined geographic domain.

14. The mobile station of claim 8, wherein the at least one establishment is at least one of a retail outlet, a restaurant, a service center and a government entity.

15. A non-transitory computer readable storage medium configured to store instructions that when executed cause a processor to perform:
    receiving at least one advertisement parameter at a mobile station responsive to a notification received at an advertisement server;
    performing a modification to a current state of the mobile station based on the at least one advertisement parameter and a distance between the mobile station and at least one establishment registered with the advertisement server, wherein the modification comprises a change of audio and video controls of the mobile station; and
    increasing an intensity of the change of audio and video controls of the mobile station based on a function of the distance.

16. The non-transitory computer readable storage medium of claim 15, wherein the notification is sent automatically when the mobile station enters a predetermined geographic domain associated with the at least one establishment.

17. The non-transitory computer readable storage medium of claim 15, wherein the modification to the current state of the mobile station comprises a change in scent.

18. The non-transitory computer readable storage medium of claim 15, wherein the modification to the current state of the mobile station comprises a change in temperature.

19. The non-transitory computer readable storage medium of claim 15, wherein the processor is further configured to perform decreasing the intensity of the modification to the current state of the mobile station as the mobile station moves further from the establishment.

20. The non-transitory computer readable storage medium of claim 16, wherein the processor is further configured to perform disabling the modification to the current state of the mobile station when the mobile station exits the predetermined geographic domain.

* * * * *